Dec. 2, 1924.
L. SABO
TROLLEY HEAD
Filed Aug. 21, 1924
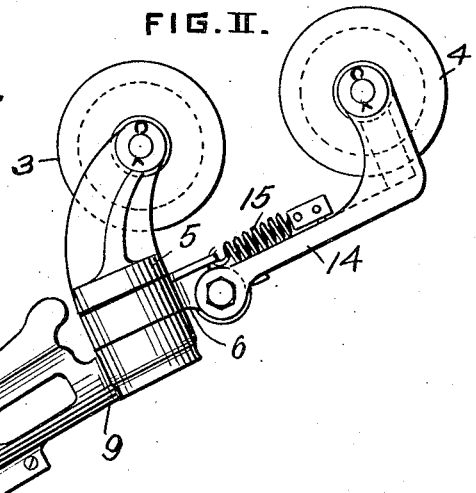
FIG. I.
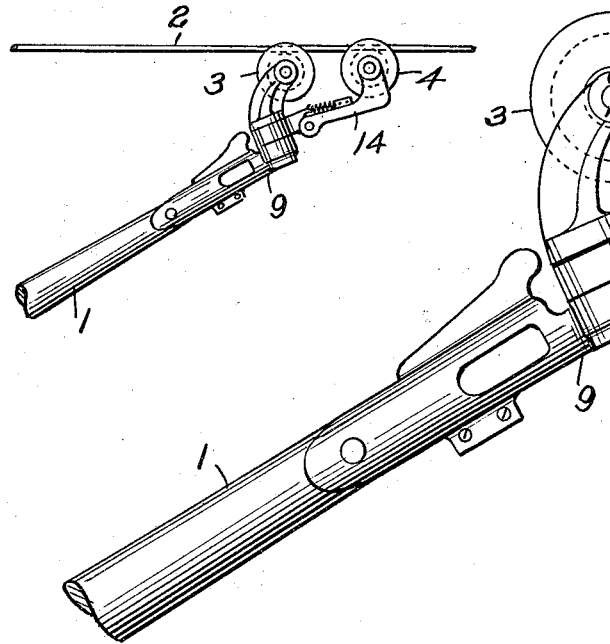
FIG. II.
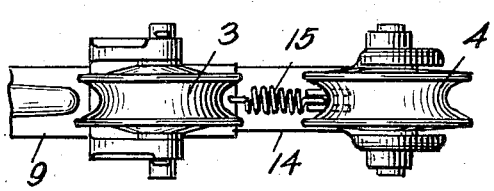
FIG. III.
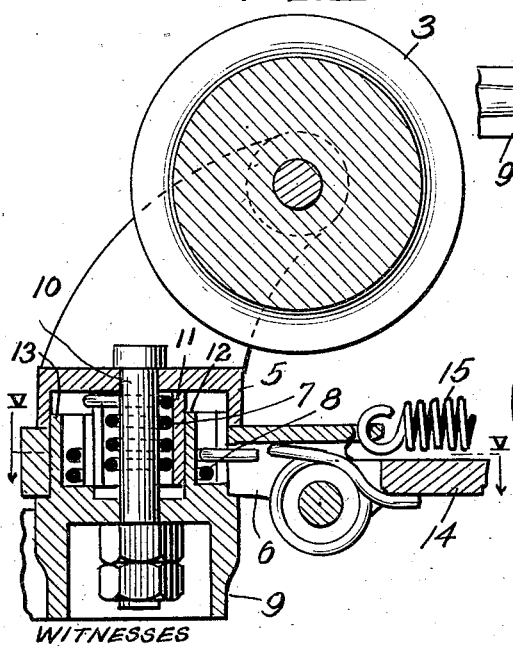
FIG. IV.
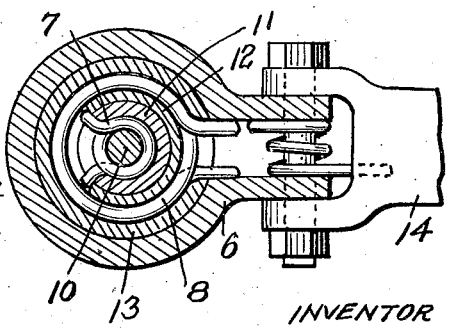
FIG. V.
WITNESSES
J. Herbert Bradley
Percy A. English
INVENTOR
Louis Sabo
by Christy and Christy
his attorneys Patented Dec. 2, 1924.

1,517,465

UNITED STATES PATENT OFFICE.

LOUIS SABO, OF CAROLINA, WEST VIRGINIA.

TROLLEY HEAD.

Application filed August 21, 1924. Serial No. 733,357.

*To all whom it may concern:*

Be it known that I, LOUIS SABO, residing at Carolina, in the county of Marion and State of West Virginia, a citizen of the Republic of Hungary, have invented or discovered certain new and useful Improvements in Trolley Heads, of which improvements the following is a specification.

My invention relates to improvements in trolley heads, and the object of invention is to afford a trolley head more secure in its engagement with the trolley wire than hitherto has been the case. It has heretofore been proposed to provide a trolley head with two trolley wire engaging wheels, to the end that the trolley head, being in engagement with the wire at two points remote one from the other, shall be in less danger of jumping from the wire as the car swings than is usually the case when there is but a single point of contact. A difficulty experienced in these trolley heads with two-point engagement is that as the trolley head meets bends and minor obstructions in the extent of the trolley wire, it still is apt to jump free of the trolley wire. By the improvement which I am about to describe, the benefits and advantages of two-point engagement are enjoyed without the disadvantages of a trolley head which, with respect to the two points of contact, is rigid.

A trolley head embodying my invention is illustrated in the accompanying drawings. Figure I is a view in side elevation of the trolley head in engagement with the trolley wire. Figure II is a like view, to larger scale, of the trolley head free of engagement with the trolley wire. Figure III is a view in plan from above of the structure as shown in Figure II. Figure IV is a view, in vertical section and on still larger scale, of a portion of the structure of Figure II. Figure V is a view on a plane at right angles to the plane of Figure IV, the plane indicated by the broken line V—V, Figure IV.

Referring first to Figure I of the drawings, the upper end of a trolley pole is indicated at 1, and the trolley head which it bears is shown to be in engagement with a trolley wire 2. The trolley head includes two trolley wheels 3 and 4, shown in Figure I to be both of them in engagement with the trolley wire 2. The trolley wheel 3 is rotatable on a horizontal axis in a block 5. The trolley wheel 4 is rotatable on a horizontal axis in a block 6. Both the block 5 and the block 6 are rotatably borne by the trolley pole 1, and the axis of rotation of these two blocks in their bearing upon trolley pole 1 extends in vertical plane and perpendicularly to the longitudinal axis of the pole itself. Comparison of Figures IV and V will show the preferred arrangement, in which the axis of rotation of blocks 5 and 6 is a common axis. Both of these two blocks are yieldingly held against rotation by two springs 7 and 8. Figures IV and V show the preferred minute construction. To the upper end of the trolley pole 1 a harp 9 is properly secured. A bolt 10 passing through the harp 9 affords an axle for the suitably arranged blocks 5 and 6 pivoted upon it. Concentric cylindrical extensions 11 upon blocks 5 and 12 upon harp 9 with aligned openings through which the terminals of the coiled spring 7 extend, as particularly shown in Fig. V, afford yielding resistance to the turning of block 5 upon its axis in harp 9. Similarly the essentially cylindrical block 6 and the cylindrical extension 13 upon harp 9 with aligned side openings through which the terminals of the coiled spring 8 extend, afford a structure in which spring resistance opposes the tendency of block 6 to turn upon its axis in the harp 9.

Additionally the block 6 is rotatable on a horizontal axis in its bearing by the trolley pole. To this end the block 6 is preferably made in two parts, of which the outer, 14, is hinged upon the inner on a horizontal axis, and a spring 15 is provided tending to hold the extension 14 in raised position, and yieldingly to resist downward swing of the extension 14 upon its horizontal axis.

Operation will readily be understood. The trolley head is applied to the wire in the usual manner, and occupies normally the position shown in Figure I. As the trolley swings around curves and irregularities in the track, the fact that the head makes engagement at two points with the trolley wire, at the points of tangency of the two trolley wheels, makes for security of engagement with the wire.

Furthermore, as in the travel the head passes around turns and over irregularities in the extent of the trolley wire 2, the fact that the two trolley wheels are independently rotatable with respect to the trolley pole, and are yieldingly held by spring tension against rotation, together with the additional fact that they are mounted for relative movement against spring tension in vertical plane, also insures their continuing contact with the wire under conditions when a more rigid structure would jump from the wire.

The trolley head which I have described, maintaining as it does unbroken engagements with the trolley wire under conditions of service, insures continuous flow of current to the motor, and does not spark. It is safe, therefore, for service in gassy coal mines. Furthermore, there is not, in consequence of accidental escape of the trolley head from engagement with the trolley wire, undue generation of heat with consequent consumption of oil and relatively destructive wear.

I claim as my invention:

1. In a trolley head the combination with a trolley pole of two blocks rotatably mounted and each independently rotatable on a common axis perpendicular to the axis of the pole, and two trolley wheels, one rotatably carried by each of said blocks.

2. In a trolley head the combination with a trolley pole of two blocks rotatably mounted thereon and independently rotatable upon a common axis perpendicular to the axis of the pole, one of said blocks being composed of an inner and an outer section, the inner section being immediately mounted upon the trolley pole and the outer section being pivotally mounted upon the inner on a horizontal axis, and two trolley wheels, one rotatably carried by each of the said blocks, the wheel which is carried by the block which as aforesaid is compound being carried by the outer section thereof.

3. In a trolley head the combination with a trolley pole of two blocks borne by said pole and rotatable on a common axis perpendicular to the axis of the pole and each rotatable independently of the other on such axis, means for yieldingly resisting block rotation, each of said blocks carrying rotatably a trolley wheel.

4. In a trolley head the combination with a trolley pole of a block borne by said pole and rotatable thereon on an axis lying in vertical plane and perpendicular to the axis of the pole, means for yieldingly resisting block rotation, a trolley wheel rotatably borne by said block, a second block borne also by said pole and rotatable also thereon on an axis lying in vertical plane and perpendicular to the axis of the pole, means for yieldingly resisting rotation of said second block on the axis defined, said second block being additionally rotatable with respect to the pole on a horizontal axis, and means for yieldingly resisting rotation of said second block on such horizontal axis, and a trolley wheel rotatably borne by said second block.

In testimony whereof I have hereunto set my hand.

LOUIS SABO.

Witnesses:
NELLA MASON,
C. A. STARCHER.